(12) United States Patent
Chung et al.

(10) Patent No.: US 7,674,846 B2
(45) Date of Patent: Mar. 9, 2010

(54) PAINT COMPOSITION OF CATIONIC ELECTRODEPOSITION AND METHOD OF PREPARING THE SAME

(75) Inventors: Hoon Chung, Suwon-si (KR); Jong-Myung Hong, Anyang-si (KR)

(73) Assignee: DPI Holdings Co., Ltd.,, Gyeonggi-do (KR)

( * ) Notice: Subject to any disclaimer, the term of this patent is extended or adjusted under 35 U.S.C. 154(b) by 626 days.

(21) Appl. No.: 11/517,260

(22) Filed: Sep. 8, 2006

(65) Prior Publication Data

US 2007/0155916 A1     Jul. 5, 2007

(30) Foreign Application Priority Data

Dec. 30, 2005    (KR) ........................ 10-2005-0135001

(51) Int. Cl.
| | |
|---|---|
| C08L 63/00 | (2006.01) |
| C08K 3/04 | (2006.01) |
| C08K 3/10 | (2006.01) |
| C08K 3/34 | (2006.01) |
| C25D 9/00 | (2006.01) |
| B32B 27/38 | (2006.01) |

(52) U.S. Cl. ........................ 523/415; 523/402; 523/440; 523/457; 523/458; 523/460; 523/468; 205/317; 428/413; 428/418

(58) Field of Classification Search ................. 205/316, 205/317, 323; 427/58, 386, 457; 428/413, 428/414, 416, 418; 523/402, 415, 457, 458, 523/459, 460; 525/107, 111, 523, 528, 529, 525/530, 533
See application file for complete search history.

(56) References Cited

U.S. PATENT DOCUMENTS

| | | | | |
|---|---|---|---|---|
| 4,882,090 | A | * | 11/1989 | Batzill et al. ................. 252/511 |
| 5,096,556 | A | * | 3/1992 | Corrigan et al. ............. 204/502 |
| 7,387,718 | B2 | * | 6/2008 | Cheong ...................... 205/323 |
| 2005/0165134 | A1 | * | 7/2005 | Cheong ...................... 523/404 |

FOREIGN PATENT DOCUMENTS

KR      1020050070495 A     7/2005

* cited by examiner

Primary Examiner—Michael J Feely
(74) Attorney, Agent, or Firm—Harness, Dickey & Pierce, P.L.C.

(57) ABSTRACT

As a paint composition of cationic electrodeposition and a method preparing thereof, the paint composition of cationic electrodeposition comprises about 42 to about 47 percent by weight of a cationic electrodeposition resin composition, about 6 to about 13 percent by weight of a pigment paste composition, and about 40 to about 48 percent by weight of ion exchange water. An electronic part film coated by utilizing the paint composition of cationic electrodeposition on alloy such as an iron, an aluminum, etc. does not include a lead and a tin. In addition, when assembling electronic parts, an error rate is minimized by inhibiting frictional static electricity through anti-static capacity, and the probability of a fire is dirninished by inhibiting static electricity.

20 Claims, 1 Drawing Sheet

PAINT COMPOSITION OF CATIONIC ELECTRODEPOSITION AND METHOD OF PREPARING THE SAME

CROSS REFERENCE TO RELATED APPLICATIONS

This application claims priority from Korean Patent Application No. 2005-135001, filed on Nov. 30, 2005, the contents of which are incorporated herein by reference in their entire.

BACKGROUND OF THE INVENTION

1. Field of the Invention

Example embodiments of the present invention relate to a paint composition of cationic electrodeposition and a method of preparing the same. More particularly example embodiments of the present invention relate to a paint composition of cationic electrodeposition which a dried film coated with does not include heavy metals such as lead, tin, etc., and minimizes error rate by prohibiting frictional electricity in assembling electronic parts, and a method of preparing the paint composition of cationic electrodeposition.

2. Description of the Related Art

An electrodeposition paint is used in electronic parts, which require a high rust inhibition while coating an object by electrically educing paint particles. For example, an electrodepositon paint is used in a coating of hard disk drive. As an auxiliary memory device of a computer, a hard disk drive analyzes data stored by a magnetic head or records data in a magnetic disk. A base frame is produced by die casting an aluminum alloy in order to protect a hard disk drive, and coating films are continuously formed on the hard disk drive by electrodeposition coating in order to protect the base frame.

Generally, an electrodeposition paint is a cationic epoxy electrodeposition paint, a cationic acrylic electrodeposition paint, an anionic electrodeposition paint, etc.

In the case an electrodeposition film is coated with a cationic electrodeposition epoxy paint, a dried film includes a lead and a tin to improve corrosion resistance of materials. In conventional processes, a cationic epoxy electrodeposition paint including a lead but excluding a tin is used so as to coat the base frame of a hard disk drive. But according as the restriction of environmental contamination progress rapidly in order to remove or reduce harmful material such a lead etc. from the film of electrodeposition paint composition, the removing of a lead has been required from cationic epoxy electrodeposition paint for use of coating base frame of hard disk drive. Hence, researches to exclude factors that may affect drive performance of a hard disk drive by exposing an aluminum alloy have been actively pursued while removing a lead and a tin from usual base frame film of a hard drive disk. Here, the aluminum alloy results from appearance defect of pin to hole phenomena by generation of hydrogen gas in the case of coating. For example, Korean Patent Laid Open Publication No. 2005-0070495 discloses an electrodeposition paint removing a lead and a tin from a dried film.

When coating electronic parts and metallic materials by utilizing the epoxy electrodeposition paint that does not include tin, frictional electricity may be generated in an assembling process. Here, in case that a hard disk drive is completed, a data loss may be generated.

Accordingly, a paint composition of cationic electrodeposition is needed that the dried film coated with on electronic parts of iron and aluminum alloy dose not includes lead, tin etc., may have a surface resistance and a tribocharge within a proper range and prevent frictional electricity from being generated through anti-static capacity.

SUMMARY OF THE INVENTION

Example embodiment of the present invention provides a paint composition of cationic electrodepsition, which is free of metals, and prevents frictional static electricity.

Example embodiment of the present invention also provides a method of preparing the paint composition of cationic electrodeposition.

DESCRIPTION OF THE EMBODIMENTS

Figure 1:
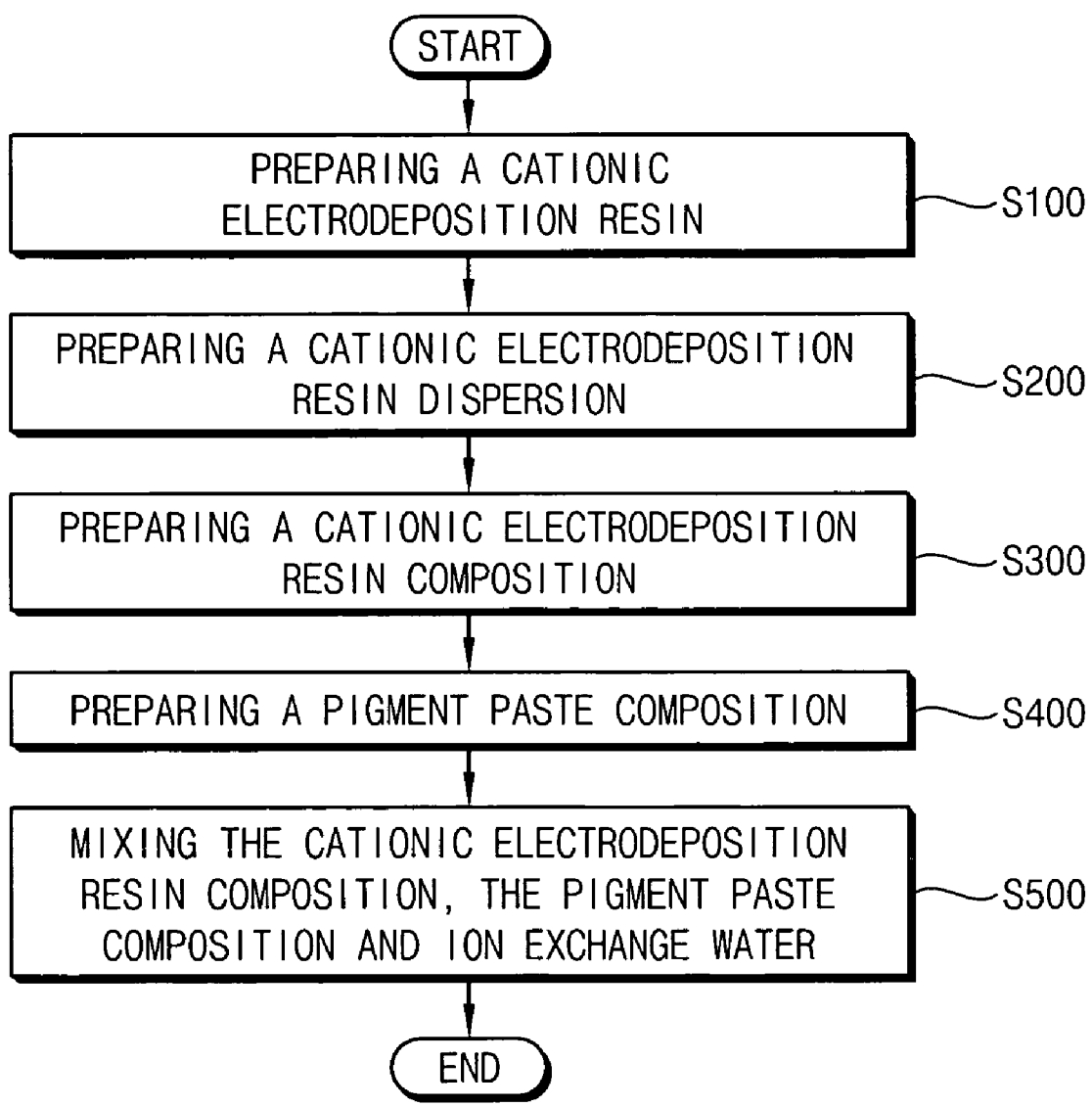
FIG. 1 is a flow chart that illustrates a method of preparing a paint composition of cationic electrodeposition in accordance with one example embodiment of the present invention.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the FIGs. It will be understood that the spatially relative terms are intended to encompass different orientations of the device in use or operation in addition to the orientation depicted in the FIGs. For example, if the device in the FIGs is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the present invention are described herein with reference to cross-sectional illustrations that are schematic illustrations of idealized embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the FIGs are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In an example embodiment of the present invention, a paint composition of cationic electrodeposition comprises about 42 to about 47 percent by weight of a cationic electrodeposition resin composition, about 6 to about 13 percent by weight of a pigment paste composition and about 40 to about 48 percent by weight of ion exchange water. Here, the cationic electrodeposition resin composition comprises about 80 to about 95 percent by weight of a cationic electrodeposition resin dispersion, about 5 to about 15 percent by weight of a cationic microgel and about 0.5 to about 2 percent by weight of ethylene glycol monohexyl ether based on a total weight of the cationic electrodeposition resin composition. In addition, the cationic electrodeposition resin dispersion comprises about 35 to about 50 percent by weight of a cationic electrodeposition resin, about 0.5 to about 3 percent by weight of zinc acetate and about 55 to about 65 percent by weight of deionized water based on a total weight of the cationic electordeposition resin dispersion. Also, the cationic electrodeposition resin comprises about 50 to about 70 percent by weight of cationic synthetic resin including an amino group and about 30 to about 50 percent by weight of a polyisocyanate curing agent having a partially blocked isocyanate functional group based on a total weight of cationic electrodeposition resin.

In another example embodiment of the present invention, as a method of preparing the paint composition of cationic electrodeposition, a cationic eletrodeposition resin is prepared by polymerizing about 50 to about 70 percent by weight of a cationic eletrodeposition synthetic resin including an amino group and about 30 to about 50 percent by weight of a polyisocyanate curing agent having a partially blocked isocyanate functional group based on a total weight of the cationic electrodeposition resin. A cationic electrodeposition resin dispersion is prepared by dispersing about 35 to about 50 percent by weight of the cationic eletrodeposition resin in aqueous media including about 0.5 to about 3 percent by weight of a zinc acetate and about 55 to about 65 percent by weight of deionized water based on a total weight of the cationic eletrodeposition resin dispersion. Thereafter, a cationic electrodeposition resin composition is prepared by adding 5 to about 15 percent by weight of a cationic micro gel and 0.5 to about 2 percent by weight of ethylene glycol monohexylether, to about 80 to about 95 percent by weight of the cationic electrodeposition resin dispersion based on a total weight of the cationic electrodeposition resin composition. Also, a pigment paste composition is prepared by mixing about 25 to about 35 percent by weight of a pigment grinding vehicle, about 3 to about 12 percent by weight of a carbon black, about 1 to about 5 percent by weight of a bismuth compound and ion exchange water based on a total weight of the pigment paste composition. A paint composition of cationic electrodeposition is prepared by mixing about 42 to about 47 percent by weight of the cationic electrodeposition resin composition, about 6 to about 13 percent by weight of the pigment paste composition, and about 40 to about 48 percent by weight of ion exchange water based on a total weight of the paint composition of cationic electrodeposition.

Hereinafter, the paint composition of cationic electrodeposition and a method preparing the paint composition of cationic electrodeposition are described in detail. The examples are given solely for the purpose of illustration and are not to be construed as limitations of the present invention as many variations there of are possible without departing from the spirit and scope of the invention.

FIG. 1 is a flow chart, which illustrates a method preparing a paint composition of cationic electrodeposition in accordance with example embodiment of the present invention.

Referring to FIG. 1, a cationic electrodeposition resin is prepared by polymerizing a cationic electrodeposition synthetic resin including an amino group and a polyisocyanate curing agent having a partially blocked isocyanate functional group (step S100). A cationic electrodeposition resin dispersion is prepared by dispersing the cationic electrodeposition resin in aqueous media including zinc acetate and deionized water (step S200). A cationic eletrodeposition resin composition is prepared by adding a cationic micro gel and ethylene glycol monohexylether to the cationic electrodeposition resin dispersion (step S300). Thereafter, a pigment paste composition is prepared by mixing a pigment grinding vehicle, a carbon black, a bismuth compound and ion exchange water (step S400). A paint composition of cationic electrodeposition is prepared by mixing the cationic electrodeposition resin composition, the pigment paste composition, and ion exchange water (step S500).

Hereinafter, the paint composition of cationic electrodeposition and the method preparing thereof will be described in detail.

Cationic Electrodeposition Resin Composition and Method of Preparing the Same

Referring to FIG. 1, a cationic eletrodeposition resin is prepared by polymerizing a cationic electrodeposition synthetic resin including an amino group and a polyisocyanate curing agent having a partially blocked isocyanate (step S100).

The cationic electrodeposition synthetic resin performs a function of resin for forming film in the paint composition of cationic electrodeposition. The cationic electrodeposition synthetic resin includes an amino group, which is prepared by addition reactions of polyepoxide and a primary, a secondary or a tertiary amine group.

The cationic electrodeposition synthetic resin including the amino group is prepared by using epoxy resin, polycaprolactonediol, bisphenol A and benzyl dimethyl amine.

When the cationic electrodeposition synthetic resin including the amino group is used below about 50 percent by weight based on a total weight of the cationic electrodeposition resin, it is difficult to prepare aqueous dispersion because of decreasing a hydrophilic part while dispersing the synthetic resin. When the cationic electrodeposition synthetic resin including the amino group is used above about 70 percent by weight based on a total weight of the cationic electrodeposition resin, it becomes difficult to acquire a thickness of film that may be required in the electrodeposition coating and flaws such as pinholes, etc, may be generated on the film. Hence the cationic electrodeposition synthetic resin is preferably used in the range of about 50 to about 70 percent by weight based on the total weight of the cationic electrodeposition resin.

The cationic electrodeposition synthetic resin including the amino group is reacted with a polyisocyanate having a partially blocked isocyanate functional group so as to form a cationic electrodeposition resin as a curing agent.

The polyisocyanate having the partially blocked isocyanate functional group is reacted with a hydroxyl functional group of a back bone in the cationic electrodeposition synthetic resin including the amino group to form a urethane cross-linking bond, or is reacted with an activated hydrogen of a terminal amino group in the cationic electrodeposition synthetic resin including the amino group to form a urea cross-linking bond, when a partially blocked isocyanate is dissociated to form the isocyanate functinol group again in a thermal curing process.

Examples of the polyisocynate curing agent may include isophorone diisocyanate, hexamethylene diisocyanate, or biuret compound thereof; polymeric methylene diisocyanate mixed with 4,4-bismethylene diisocyanate monomer or oligomer thereof; 4,4-dicyclohexyl methane diisocyanate; and noborane diisocyanate etc. In addition, blocking materials such as methyl ethyl ketoxime, diethyl malonate, dimethyl pyrazole, ϵ-caprolactam and ether with hydroxyl functional group are available in order to block the isocyanate functional group.

According to an example embodiment of the present invention, the polyisocyanate curing agent having a partially blocked functional group may be solely prepared by reacting the polyisocyanate with a blocking material. According to another example embodiment of the present invention, after polyisocyanate is reacted with trimethylol propane to increase a molecular weight, the resultant, again, is reacted with the blocking material of diethyl malonate, methylethyl ketoxim, dimethyl pyrazole, ϵ-caprolactam, an ether having a hydroxyl functional group, etc so as to form the polyisocyanate curing agent having the partially blocked isocyanate functional group.

When the amount of the polyisocyanate curing agent used is below about 30 percent by weight based on a total weight of a cationic electrodeposition resin, properties such as a pencil hardness and a salt tolerance are diminished because of an insufficient hardness. When the amount of the polyisocyanate curing agent used exceeds about 50 percent by weight based on a total weight of cationic electrodeposition resin, it is difficult to prepare aqueous dispersion and properties such as an impact resistance and a flexibility resistance are diminished. Therefore the polyisocyanate curing agent is preferably used in the range of about 30 to about 50 percent by weight, more preferably about 35 to about 45 percent by weight based on a total weight of the cationic electrodeposition resin.

A cationic electrodeposition resin dispersion is prepared by dispersing the cationic eletrodeposition resin that is prepared by reacting the cationic electrodeposition synthetic resin including the amino group with the polyisocyanate in aqueous media including zinc acetate and deionized water (step S200).

According to an example embodiment in the present invention, the cationic electrodeposition resin dispersion includes about 35 to about 50 percent by weight of the cationic electrodeposition resin, about 0.5 to about 3 percent by weight of zinc acetate, and about 55 to about 65 percent by weight of deionized water.

The aqueous media may include deionized water and zinc acetate. The zinc acetate in the aqueous media improves corrosion resistance in a dried film on which the paint composition of cationic electrodeposition is coated. When the amount of the zinc acetate used is below about 0.5 percent by weight based on a total weight of the cationic electrodeposition resin dispersion, chemical properties such as a corrosion resistance etc are deteriorated. When the amount of the zinc acetate used exceeds 3 percent by weight based on a total weight of cationic electrodeposition resin dispersion, the zinc acetate is dissociated into a zinc ion and two acetate molecules when the zinc acetate is in aqueous media. Here, the acetate molecules thus generated affect electrical properties of electrodeposition paint when the cationic electrodeposition resin is dispersed in aqueous media. Accordingly, the zinc acetate is used preferably in the range of about 0.5 to about 3 percent by weight based on a total amount of the cationic electrodeposition resin dispersion.

The aqueous media further comprises an acid as neutralization agent. Examples of acids may include formic acid, acetic acid, lactic acid, phosphoric acid, etc.

Referring to FIG. 1, a cationic electrodiposition resin composition is prepared by adding a cationic micro gel and ethylene glycol monohexyl ether to the cationic electrodeposition resin dispersion (step S300).

Particularly, the cationic electrodeposition resin composition is prepared by adding about 5 to about 15 percent by weight of the cationic micro gel and about 0.5 to about 2 percent by weight of ethylene glycol monohexyl ether to about 80 to about 95 percent by weight of the cationic electrodeposition resin dispersion based on a total weight of the cationic electrodeposition resin composition.

The cationic micro gel is obtained by mixing a cationic surfactant of self cross-linking type, a compound of inner cross-linking type, and an initiator.

The cationic surfactant of self cross-linking type is prepared by mixing isocyanate having a partially blocked isocyanate functional group, ethylene glycol monobutyl ether, isocyanate of cationic quaternary ammonium salt, organic acid, deionized water, etc. with polyepoxide having an epoxy equivalent weight of about 300 to about 1500. Example of the compounds of inner cross-linking types may include ethylene glycol dimethacrylate, diethylene glycol dimethacrylate, 1,4-butandiol dimethacrylate, and neopentyl glycol methacrylate. These can be used alone or in a mixture thereof. Examples of initiators include 4,4'-azobis, ammonium persulfate, sodium sulfate, 2,2'-azobis, etc. These can be used alone or in a mixture thereof.

The cationic micro gel improves a contamination resistance and a corrosion resistance of edge portions in coated objects. When the amount of the cationic micro gel used is below about 5 percent by weight based on a total weight of the cationic electrodeposition resin composition, it is difficult to improve the rust inhibition in edge parts. When the amount of cationic micro gel used exceeds about 15 percent by weight based on a total weight of the cationic eletrodeposition resin composition, appearance of the electrodeposition film turns out bad, thereby making it difficult to control generation of frictional electricity by anti-static capacity while a coated film maintains a surface resistance of about $10^5$ to about $10^9$ $\Omega$/sq and a tirbocharge of less than about 5 nC. Accordingly, the amount of the cationic micro gel used is preferably in the range of about 5 to about 15 percent by weight based on a total weight of the cationic electrodeposition resin composition.

The ethylene glycol monohexyl ether blocks appearance defect such a pin hole by generating gases and maintains the surface resistance and the tribocharge, thereby removing a surface roughness. As a result, the ethylene glycol monohexyl ether controls generation of a frictional electricity during the electrodeposition coating process.

When the amount of the ethyleneglycol monohexyl ether used is below about 0.5 percent by weight based on a total weight of the cationic electrodeposition resin composition, it is difficult to control appearance defect by generating hydrogen gases and surface roughness. When the amount of the ethylene glycol monohexylether used exceeds about 2 percent by weight based on a total weight of the cationic electrodeposition resin composition, a thickness of the film is largely increased, but a throwing power is diminished because of low coating voltage while the electrodeposition coating. Accordingly, the amount of the ethylene glycol monohexyl ether used is preferably in the range of about 0.5 to about 2 percent by weight based on a total weight of cationic electrodeposition resin composition.

The cationic electrodeposition resin composition in the paint composition of cationic eletrodeposition includes solid contents of about 35 to about 38%. And acid concentration therein is in the range of about 28 to about 35 mg/eq, and pH value therein is in the range of about 6 to about 7

Pigment Paste Composition and Method of Preparing the Same

Referring to FIG. 1, a pigment paste composition is prepared (step S400).

A pigment paste composition in the present invention is prepared by mixing a pigment grinding vehicle, a carbon block, a bismuth compound, and ion exchange water. Particularly, the pigment paste composition in the present invention is prepared by mixing about 25 to about 35 percent by weight of the pigment grinding vehicle, about 3 to about 12 percent by weight of the carbon black, about 1 to about 5 percent by weight of the bismuth compound and ion exchange water based on a total weight of the pigment paste composition.

According to one example embodiment of the present invention, the pigment grinding vehicle is prepared by mixing about 25 to about 35 percent by weight of polyglycidylether of bisphenol A, about 5 to about 12 percent by weight of propylene glycol monomethyl ether acetate, about 8 to about 15 percent by weight of isocyanate cross-linking agent having a partially blocked isocyanate functional group, about 25 to about 40 percent by weight of ethylene glycol monobutyl ether, about 10 to about 20 percent by weight of organic tertiary amine acid salt and about 0.1 to about 5 percent by weight of deionized water based on a total weight of the pigment grinding vehicle.

The pigment grinding vehicle performs a function of a dispersion agent that adjusts a size of pigment particles such as a carbon block, an aluminum silicate, etc less than 10 μm. Also, the pigment grinding vehicle prevents each of pigment particles from being recoagulated. When the amount of the pigment grinding vehicle used is below about 25 percent by weight based on a total weight of the pigment paste composition, recoagulation of particulate pigment particles may be relatively easily generated, and thus the size of pigment particle is difficult to be less than about 10 μm. When the amount of the pigment grinding vehicle used exceeds about 35 percent by weight based on a total weight of the pigment paste composition, the amount of a solvent in the pigment grinding vehicle increases to thereby decrease stability because a viscosity of the pigment paste composition increases rapidly. Accordingly, an amount of the pigment grinding vehicle used in the present invention is preferably in the range of about 25 to about 35 percent by weight based on a total weight of the pigment paste composition.

The carbon black included in the pigment past composition of the present Invention has a proper range of a surface resistance and frictional electricity, and prevents anti-static capacity from generating static electricity.

The carbon black has an average primary particle size of less than about 30 nm and a surface area of more than about 250 m$^2$/g. Further, when the amount of the carbon black used is below about 3 percent by weight based on a total weight of the pigment paste composition, the surface resistance may be increased and static electricity may be often generated because tribocharge is too high to have anti-static capacity in a dried film. In addition, when the amount of the carbon black used exceeds 12 percent by weight based on a total weight of the pigment paste composition, electrical properties such a surface resistance, tribocharge, etc. may be excellent but a viscosity of the pigment paste composition may be rapidly increased due to an increase of a surface area in the carbon black, and a storage stability may be worsened by recoagulation. Therefore, the amount of the carbon black in the pigment paste composition is preferably used in the range of about 3 to about 12 percent by weight based on a total weight of the pigment paste composition.

The bismuth compound included in the pigment paste composition of the present invention improves corrosion resistance in the dried film of electrodeposition coating. Examples of the bismuth compounds include bismuth oxide, bismuth hydroxide, bismuth trioxide, etc. When the amount of the bismuth compound used in the pigment paste composition is below 1 percent by weight based on a total weight of the pigment paste composition, corrosion resistance of a dried film is deteriorated, and thus corrosion may be relatively easily generated. When the amount of the bismuth compound used in the pigment paste composition exceeds about 5 percent by weight based on a total weight of the pigment paste composition, the stability of the pigment paste composition is deteriorated since a surface area of the bismuth compound is larger than that of a conventional lead compound. Hence, the amount of the bismuth compound used in the pigment paste composition is preferably in the range of about 1 to about 5 percent by weight based on a total weight of the pigment paste composition.

According to an example embodiment of the present invention, in the pigment paste composition, the amount of solid contents used is about 40 to about 45 percent by weight and a value of pH therein is in the range of about 8 to about 9.

Additionally, according to an example embodiment of the present invention, the pigment paste composition further includes a pigment such as an aluminum silicate in order to improve mechanical properties.

Paint Composition of Cationic Electrodeposition and Method Preparing the Same Referring to FIG. 1, a paint composition of cationic electrodeposition is prepared by mixing the cationic electrodeposition resin composition, the pigment paste composition, prepared according to the method mentioned above, and ion exchange water (step S500).

Particularly, the paint composition of the cationic electrodeposition in the present invention is prepared by mixing about 42 to about 47 percent by weight of cationic electrodeposition resin composition, about 6 to about 13 percent by weight of pigment paste composition, and about 40 to about 48 percent by weight of ion exchange water.

When the amount of the cationic electrodeposition resin composition used in the paint composition of cationic electrodeposition is below about 42 percent by weight based on a total weight of the paint composition of cationic electrodeposition, a corrosion resistance and mechanical properties may be deteriorated. In addition, when the amount of the cationic electrodeposition resin composition used in the paint composition of cationic electrodeposition in the present invention exceeds about 47 percent by weight based on a total weight of the paint composition of cationic electrodeposition, the amount used of the carbon black mixed in dried film is so low that the static electricity may not be inhibited by anti-static capacity, while a surface resistance is maintained about $10^5$ to about $10^9$ $\Omega$/sq and a tribocharge is maintained less than about 5 nC. As a result, the amount of the cationic electrodeposition resin composition used is preferably in the range of about 42 to about 47 percent by weight based on a total weight of the paint composition of cationic electrodeposition.

When the amount of the pigment paste composition used in the paint composition of cationic electrodeposition is below about 6 percent by weight based on a total weight of the paint composition of cationic electrodeposition, the amount of the carbon black used is so low in the electrodeposition coating film that a static electricity is not inhibited by an anti-static capacity while about $10^5$ to about $10^9$ $\Omega$/sq of surface resistance and less than about 5 nC of tribocharge are maintained. Additionally, when the used amount of the pigment paste composition including the carbon black having conductivity exceeds about 13 percent by weight based on a total weight of the paint composition of cationic electrodeposition, the conductivity of dried film is greatly increased that electric current may eliminate a function of electronic parts in the case of applying to electronic parts. Therefore, the amount of the pigment paste composition is preferably used in the range of about 6 to about 13 percent by weight based on a total weight of the paint composition of cationic electrodeposition in the paint composition of cationic electrodeposition.

The obtained film coated with the paint composition of the cationic electrodeposition in the present invention does not include heavy metal such a lead, a tin, etc. and the static electricity is prevented from being generated by anti-static capacity while about $10^5$ to about $10^9$ $\Omega$/sq of a surface resistance and less than about 5 nC of a tribocharge are maintained. Accordingly, when the paint composition of cationic electrodeposition is used in electronic parts such as an alloy of iron, aluminum, etc., the rate of generating errors may be minimized.

EXAMPLE 1

1. Preparation of the Cationic Electrodeposition Resin Composition 1-1. Preparation of Cationic Electrodeposition Resin After 29.0 percent by weight of EPIKOTE 828CD, 10.38 percent by weight of PLACCEL 205, 8.45 percent by weight of bisphenol A and 2.58 percent by weight of methylisobutylketon were introduced into a reactor and heated upto 140° C. under a nitrogen atmosphere, 0.04 percent by weight of benzyldimethyl amine was added and again heated to 180° C. Water was removed by performing a reaction for about 30 minutes at reflux temperature. After a reaction mixture was cooled to 160° C. and stood for one and a half hours, the reaction mixture was cooled to 145° C. again and was added with 0.12 percent by weight of benzyldimethyl amine. At a temperature of about 145° C., the resulting mixture was reacted for about two and a half hours to prepare cationic electrodeposition synthetic resin including an amino group having an epoxy equivalent weight of about 15000. 3.21 percent by weight of diketimine (73% solid contents in methylisobutylketon) induced from diethylenetriamine and methylisobutylketone, and 2.78 percent by weight of an N-methyl ethanolamine were added to the cationic electrodeposition synthetic resin at a temperature of about 100 to about 110° C. Then, the reaction was performed for one hour at a temperature of 125° C. The reaction products were cooled to a temperature of about 100° C., and 43.23 percent by weight of blocked isocyanate cross-linking agents and 0.21 percent by weight of Surfynol DF-110 were slowly added, and thus a cationic electrodeposition resin with 82 percent by weight of solid contents was prepared.

Ingredients of the cationic electrodeposition resin and the contents thereof are described in the following table 1.

TABLE 1

| Ingredient | Percent by Weight |
| --- | --- |
| EPIKOTE 828CD | 29.0 |
| PLACCEL205 | 10.38 |
| Bisphenol A | 8.45 |
| Methylisobutylketone | 2.58 |
| Bezyldimethylamine | 0.16 |
| Diketimine | 3.21 |
| N-methylethanolamine | 2.78 |
| Blocked Polyioscyanate Cross-Linking Agent | 43.23 |
| Surfynol DF to 104 | 0.21 |

EPIKOTE 828CD is an epoxy resin manufactured by the reaction of epichlorohydrin and bisphenol A and is available from the Kumho P&B C., Ltd. In Korea. The epoxy equivalent weight thereof was about 188.

PLACCEL 205 is a merchandised product of polycaprolactondiol, which is manufactured by DICEL Corp., in Japan.

The blocked polyisocyanate cross-linking agent was manufactured by a following method. Isophorone diisocynate, which may be purchased from DEGUSA Co., in Korea, was reacted with trimethylol propane at a molar ratio of 3:1. Then, the resulting product was mixed with methylketoxim at a molar ratio of 8:2 and blocked isocyanate to form cross-linking agent.

Surfynol DF-104 is an anti foaming agent, which is manufactured by Air Product Company.

1-2. Preparation of the Cationic Electrodeposition Resin Dispersion

After 52.06 percent by weight of deionized water, 1.05 percent by weight of 90% lactic acid and 1.4 percent by weight of zinc acetic acid were successively introduced and homogenized, 45.49 percent by weight of a cationic electrodeposition resin was slowly added and stirred at a high speed in order to disperse into water. Meanwhile, the resulting product was extracted under a reduced pressure of about 60 mmHg at a temperature of about 60° C. to remove the organic solvent having a low boiling point. Then, the aqueous dispersion resin was filtered by a diatomaceous earth to obtain an aqueously dispersed cationic electrodeposition resin, which included 39.8 percent by weight of solid contents and had less than about 90 nm of an average particle size.

Ingredients of cationic electrodeposition resin dispersion and the contents thereof are described in the following Table 2.

TABLE 2

| Ingredient | Percent by Weight (%) |
| --- | --- |
| The Obtained Cationic Electrodeposition Resin | 45.49 |
| 90% Lactic Acid | 1.05 |
| Zinc Acetate | 1.40 |
| Deionized Water | 52.06 |

1-3. Preparation of the Paint Composition of Cationic Electrodeposition

While the obtained 84 percent by weight of the cationic electrodeposition resin dispersion was stirred, mixtures of 4.0 percent by weight of ion exchange water and 0.9 percent by weight of ethylene glycol monohexyl ether were slowly introduced. Then the cationic electrodeposition resin compound was prepared by adding 11.1 percent by weight of cationic micro gel and homogenizing the resulting product.

Ingredients of the paint composition of cationic electrodeposition and contents thereof are described in the following Table 3.

TABLE 3

| Ingredient | Percent by Weight (%) |
| --- | --- |
| The Obtained Cationic Electrodeposition Resin Dispersion | 84.0 |
| Cationic Micro Gel | 11.1 |
| Ethyleneglycol Monohexylether | 0.9 |
| Deionized Water | 4.0 |

2. Preparation of the Pigment Paste.

2-1. Preparation of the Pigment Grinding Vehicle 29.0 percent by weight of EPIKOTE 3004CD and 10.0 percent by weight of propylene glycol monomethyl ether acetate were added into a reactor and heated to a temperature of about 110 to about 120° C. so as to be melted homogeneously. Subsequently, after 12.0 percent by weight of the cross-linking agent having a partially blocked isocyanate was added and resulting products was stood for an hour, 33.0 percent by weight of ethylene glycol monobutyl ether was added. The reaction mixture was heated to a temperature of about 80 to about 90° C. and 14.0 percent by weight of organic tertiary amine acid salt and 2.0 percent by weight of deionized water were added to the resulting product, which was stood until the acid value became about 0.8, and thus the pigment grinding vehicle was obtained. Here, an epoxy equivalent weight of polyglycidyl ether of bisphenol A is about 900 to about 1200.

Ingredients of the pigment grinding vehicle and the contents thereof are described in the following Table 4.

TABLE 4

| Ingredient | Percent by Weight (%) |
| --- | --- |
| EPIKOTE 3004CD | 29.0 |
| Propylene Glycol Monomethyl Ether Acetate | 10.0 |
| Partially Blocked Isocyanate Cross-Linking Agent | 12.0 |
| Ethylene Glycol Monobutyl Ether | 33.0 |

TABLE 4-continued

| Ingredient | Percent by Weight (%) |
| --- | --- |
| Organic Tertiary Amine acid salt | 14.0 |
| Deionized Water | 2.0 |

EPIKOTE 3004CD is a merchandised product of polyglycidylether distributed by Kumho P&B Co. in Korea.

A partially blocked isocyanate cross-linking agent was prepared by reacting 54.3 percent by weight of 2,4-tolueneisocyante and 40.7 percent by weight of 2-ethylhexanol at a temperature of less than 40° C. for about 3 hours by adding 5.0 percent by weight of methyl isobutyl keton and diluting thereof.

Organic tertiary amine acid salt was manufactured by reacting 15.5 percent by weight of dimethyl ethanolamine and 56.7 percent by weight of a partially blocked isocyanate cross-linking agent at a room temperature for two hours. The disappearance of NCO peak was confirmed at a temperature of 80° C. Then, 17.4 percent by weight of lactic acid (purity 88%), 3.5 percent by weight of deionized water and 7.0 percent by weight of ethylene glycol monobutyl ether were added and reacted at a temperature of 60° C. for an hour so as to obtain the organic tertiary amine acid salt.

2-2 Preparation of Pigment Paste Composition

The mixture including 33 percent by weight of the pigment grinding vehicle obtained above, 11 percent by weight of the carbon black having conductivity, which had an average primary particle size of less than 30 nm and a surface area of more than 250 m²/g, 13.0 percent by weight of aluminum silicate, 3 percent by weight of the bismuth trioxide, and 40.0 percent by weight of ion exchange water was grounded in a bead mill to have a particle size of 10 μm, thereby preparing the pigment paste composition having conductivity that includes the carbon black.

Ingredients of the pigment paste composition and the contents thereof are described in the following Table 5.

TABLE 5

| Ingredient | Percent by Weight (%) |
| --- | --- |
| Pigment Grinding Vehicle | 33.0 |
| Carbon Black | 11.0 |
| Aluminum Silicate | 13.0 |
| Bismuth Trioxide | 3.0 |
| Ion Exchange Water | 40.0 |

3. Preparing of the Paint Composition of Cationic Electrodeposition

The paint composition of cationic electrodeposition was prepared by mixing 42.0 percent by weight of the obtained cationic electrodeposition resin composition, which includes resin phase dispersed in aqueous media, 12.2 percent by weight of the pigment paste composition including a carbon black having conductivity, and 45.8 percent by weight of ion exchange water.

EXAMPLES 2 AND 3

The paint composition of cationic electrodeposition was prepared in the same manner as in Example 1. As shown in the following Table 6, percents by weight of the cationic electrodeposition resin composition, the pigment paste composition and ion exchange water was adjusted.

TABLE 6

|  | Example 1 | Example 2 | Example 3 |
|---|---|---|---|
| Cationic Electrodeposition Resin Composition | 42.0 | 45.0 | 47 |
| Pigment Paste Composition | 12.2 | 9.5 | 7.7 |
| Ion Exchange Water | 45.8 | 45.5 | 45.3 |

Each of metal materials was coated with the paint composition of cationic electrodeposition according to Examples 1, 2 and 3 using a direct current voltage for three minutes and dried for twenty minutes at a temperature of about 140° C. to form dried film.

Surface resistance, tribocharge and salt tolerance were measured in the dried film and the result is illustrated in the following Table 7.

TABLE 7

|  | Example 1 | Example 2 | Example 3 |
|---|---|---|---|
| Surface Resistance(Ω/sq) | $10^5$ | $10^7$ | $10^9$ |
| Tribocharge (nC) | 1.3 | 2.6 | 4.3 |
| Salt Tolerance | One Direction 0.5 mm | One Direction 0.5 mm | One Direction 0.5 mm |

Salt tolerance property: After spraying 5% NaCl solution at a temperature of about 35° C. for a thousand hours and allowing it stand for about twenty four hours, a tapping test was preformed to examine a stripped width of a taping part.

Referring to the table 6, the dried film coated with the paint composition of cationic electrodeposition according to Examples 1, 2 and 3 had a surface resistance in the range of about $10^5$ to about $10^9$ Ω/sq and a tribocharge less than about 5 nC. Therefore, according to the present invention, a dried film in which static stability is inhibited by anti-static capacity, thereby forming a good appearance and corrosion resistance can be formed.

According to the present invention, when the electronic parts of alloy such as an iron, an aluminum, etc. are coated by utilizing the paint composition of cationic electropositon including the cationic electropositon resin composition, the pigment paste composition and ion exchange water, the dried film is formed in which a static electricity is inhibited by anti static capacity and the appearance and corrosion resistance are excellent while the dried film has the surface resistance in the range of about $10^5$ to about $10^9$ Ω/sq and a tribocharge less than about 5 nC.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of this invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The present invention is defined by the following claims, with equivalents of the claims to be included therein.

What is claimed is:

1. A paint composition of cationic electrodeposition comprising:
    about 42 to about 47 percent by weight of a cationic electrodeposition resin composition;
    about 6 to about 13 percent by weight of a pigment paste composition; and
    about 40 to about 48 percent by weight of ion exchange water, based on a total weight of the paint composition of cationic electrodeposition;
    wherein the cationic electrodeposition resin composition comprises: a cationic electrodeposition resin dispersion, a cationic micro gel, and ethylene glycol monohexyl ether;
    wherein the cationic electrodeposition resin dispersion comprises a cationic electrodeposition resin dispersed in an aqueous media including zinc acetate and deionized water;
    wherein the cationic electrodeposition resin is prepared by polymerizing a cationic electrodeposition synthetic resin including an amino group and a polyisocyanate curing agent having a partially blocked isocyanate functional group;
    wherein the cationic electrodeposition synthetic resin including an amino group is prepared by addition reactions of a polyepoxide and at least one of a primary, secondary, and tertiary amine group; and
    wherein the pigment paste composition comprises a pigment grinding vehicle, a carbon black, a bismuth compound, and ion exchange water; and wherein the carbon black is present in an amount of about 3 to about 12 percent by weight, based on the total weight of the pigment paste composition.

2. The paint composition of cationic electrodeposition of claim 1, wherein the cationic electrodeposition resin dispersion comprises about 35 to about 50 percent by weight of the cationic electrodeposition resin, about 0.5 to about 3 percent by weight of zinc acetate, and about 55 to about 65 percent by weight of deionized water, based on the total weight of the cationic electrodeposition resin dispersion.

3. The paint composition of cationic electrodeposition of claim 1, wherein the cationic electrodeposition resin is prepared using about 50 to about 70 percent by weight of the cationic electrodeposition synthetic resin including an amino group and about 30 to about 50 percent by weight of the polyisocyanate curing agent having a partially blocked isocyanate functional group, based on the total weight of the cationic electrodeposition resin.

4. The paint composition of cationic electrodeposition of claim 1, wherein the polyisocyanate curing agent having a partially blocked isocyanate functional group is produced by reacting at least one polyisocyanate with at least one blocking material; wherein the at least one polyisocyanate is selected from the group consisting of isophorone diisocyanate, hexamethylene diisocyanate, a biuret compound of hexamethylene diisocyanate or isophorone diisocyanate, a polymeric methylene diisocyanate mixed with 4,4-bismethylene diisocyanate monomer or a oligomer thereof, 4,4-dicyclohexylmethane diisocyanate, and noborane diisocyanate; and wherein the at least one blocking material is selected from the group consisting of diethylmalonate, methylethylketoxim, dimethylpyrazole, ethyleneglycol monobutyl ether and diethyleneglycol monobutyl ether.

5. The paint composition of cationic electrodeposition of claim 1, wherein the pigment paste composition comprises about 25 to about 35 percent by weight of the pigment grinding vehicle, about 3 to about 12 percent by weight of the carbon black, about 1 to about 5 percent by weight of the bismuth compound, and the ion exchange water, based on a total weight of the pigment paste composition.

6. The coating composition of cationic electrodeposition of claim 1, wherein the pigment paste composition further comprises aluminum silicate.

7. The paint composition of cationic electrodeposition of claim 1, wherein the pigment grinding vehicle comprises about 25 to about 35 percent by weight of polyglycidylether of bisphenol A, about 5 to about 12 percent by weight of propyleneglycol monomethyl ether acetate, about 8 to about 15 percent by weight of isocyanate cross-linking agent having a partially blocked isocyanate group, about 25 to about 40 percent by weight of ethylene glycol monobutyl ether, about 10 to about 20 percent by weight of organic tertiary amine acid salt, and about 0.1 to about 5 percent by weight of deionized water, based on a total weight of the pigment grinding vehicle.

8. The paint composition of cationic electrodeposition of claim 1, wherein the carbon black has an average primary particle size of no more than about 30 nm and a surface area of no less than about 250 $m^2/g$.

9. The paint composition of cationic electrodeposition of claim 1, wherein the bismuth compound is at least one selected from the group consisting of bismuth oxide, bismuth hydroxide and bismuth trioxide.

10. The paint composition of cationic electrodeposition of claim 1, wherein the cationic electrodeposition resin composition comprises about 80 to about 95 percent by weight of the cationic electrodeposition resin dispersion, about 5 to about 15 percent by weight of the cationic micro gel, and about 0.5 to about 2 percent by weight of ethylene glycol monohexyl ether, based on a total weight of the cationic electrodeposition resin composition.

11. A method of preparing a paint composition of cationic electrodeposition comprising:
    preparing a cationic electrodeposition resin by polymerizing a cationic electrodeposition synthetic resin including an amino group and a polyisocyanate curing agent having a partially blocked isocyanate functional group, wherein the cationic electrodeposition synthetic resin including an amino group is prepared by addition reactions of a polyepoxide and at least one of a primary, secondary, and tertiary amine group;
    preparing a cationic electrodeposition resin dispersion by dispersing the cationic electrodeposition resin in an aqueous media including zinc acetate and deionized water;
    preparing a cationic electrodeposition resin composition by adding a cationic micro gel and ethylene glycol monohexyl ether to the cationic electrodeposition resin dispersion;
    preparing a pigment paste composition by mixing a pigment grinding vehicle, a carbon black, a bismuth compound, and ion exchange water; wherein the carbon black is present in an amount of about 3 to about 12 percent by weight, based on a total weight of pigment paste composition; and
    preparing the paint composition of cationic electrodeposition by mixing about 42 to about 47 percent by weight of the cationic electrodeposition resin composition, about 6 to about 13 percent by weight of the pigment paste composition, and about 40 to about 48 percent by weight of ion exchange water, based on a total weight of the paint composition of cationic electrodeposition.

12. The method of claim 11, wherein the cationic electrodeposition resin dispersion comprises about 35 to about 50 percent by weight of the cationic electrodeposition resin, about 0.5 to about 3 percent by weight of zinc acetate, and about 55 to about 65 percent by weight of deionized water, based on the total weight of the cationic electrodeposition resin dispersion.

13. The method of claim 11, wherein the cationic electrodeposition resin is prepared using about 50 to about 70 percent by weight of the cationic electrodeposition synthetic resin including an amino group and about 30 to about 50 percent by weight of the polyisocyanate curing agent having a partially blocked isocyanate functional group, based on the total weight of the cationic electrodeposition resin.

14. The method of claim 11, wherein the polyisocyanate curing agent having a partially blocked isocyanate functional group is produced by reacting at least one polyisocyanate with at least one blocking material; wherein the at least one polyisocyanate is selected from the group consisting of isophorone diisocyanate, hexamethylene diisocyanate, a biuret compound of hexamethylene diisocyanate or isophorone diisocyanate, a polymeric methylene diisocyanate mixed with 4,4-bismethylene diisocyanate monomer or a oligomer thereof, 4,4-dicyclohexylmethane diisocyanate, and noborane diisocyanate; and wherein the at least one blocking material is selected from the group consisting of diethylmalonate, methylethylketoxim, dimethylpyrazole, ethyleneglycol monobutyl ether and diethyleneglycol monobutyl ether.

15. The method of claim 11, wherein the pigment paste composition comprises about 25 to about 35 percent by weight of the pigment grinding vehicle, about 3 to about 12 percent by weight of the carbon black, about 1 to about 5 percent by weight of the bismuth compound, and the ion exchange water, based on a total weight of the pigment paste composition.

16. The method of claim 11, wherein the pigment paste composition further comprises aluminum silicate.

17. The method of claim 11, wherein the pigment grinding vehicle comprises about 25 to about 35 percent by weight of polyglycidylether of bisphenol A, about 5 to about 12 percent by weight of propyleneglycol monomethyl ether acetate, about 8 to about 15 percent by weight of isocyanate cross-linking agent having a partially blocked isocyanate group, about 25 to about 40 percent by weight of ethylene glycol monobutyl ether, about 10 to about 20 percent by weight of organic tertiary amine acid salt, and about 0.1 to about 5 percent by weight of deionized water, based on a total weight of the pigment grinding vehicle.

18. The method of claim 11, wherein the carbon black has an average primary particle size of no more than about 30 nm and a surface area of no less than about 250 $m^2/g$.

19. The method of claim 11, wherein the bismuth compound is at least one selected from the group consisting of bismuth oxide, bismuth hydroxide and bismuth trioxide.

20. The method of claim 11, wherein the cationic electrodeposition resin composition comprises about 80 to about 95 percent by weight of the cationic electrodeposition resin dispersion, about 5 to about 15 percent by weight of the cationic micro gel, and about 0.5 to about 2 percent by weight of ethylene glycol monohexyl ether, based on a total weight of the cationic electrodeposition resin composition.

* * * * *